United States Patent [19]

Sugiyama et al.

[11] Patent Number: 5,053,633
[45] Date of Patent: Oct. 1, 1991

[54] MOISTURE DRAIN BUSH FOR AN ENGINE STARTER MOTOR

[75] Inventors: Takeshi Sugiyama; Wakaki Miyaji; Motoi Hisamoto, all of Himeji, Japan

[73] Assignee: Mitsubishi Denki Kabushiki Kaisha, Tokyo, Japan

[21] Appl. No.: 521,519

[22] Filed: May 10, 1990

[30] Foreign Application Priority Data

May 12, 1989 [JP] Japan ................ 1-54986[U]

[51] Int. Cl.$^5$ ............................................. F02N 17/00
[52] U.S. Cl. .................................... 290/48; 74/6; 74/7 R; 310/88; 310/89
[58] Field of Search ............. 74/6, 7 R; 290/48; 310/88, 89

[56] References Cited

U.S. PATENT DOCUMENTS 4,464,593  8/1984  Kofink ......................... 310/88
4,491,754  1/1985  Gotah ......................... 310/88

FOREIGN PATENT DOCUMENTS 28261  2/1984  Japan .

Primary Examiner—J. R. Scott
Assistant Examiner—R. L. Hoover
Attorney, Agent, or Firm—Sughrue, Mion, Zinn, Macpeak & Seas

[57] ABSTRACT

A moisture drain bush for use in a moisture drain hole in an engine starter motor housing wall comprises a stem having an inner and an outer end and an axial length equal to a housing wall thickness and having an axial groove extending between the inner and the outer ends of the stem. An inner flange has a flat inner surface radially extending from the inner end of the stem and larger than the drain hole is provided. The inner flange also has an inner radial groove connected at its inner end to the inner end of the axial groove in the stem and radially extending therefrom to open at the outer periphery of the inner flange. An outer flange having a flat inner surface radially extends from the outer end of the stem and larger than the drain hole is provided. The outer flange has an outer radial groove extending across the outer flange to open at the outer periphery of the outer flange at substantially diametrically opposite positions, the outer radial groove being connected to the outer end of the axial groove. Thus, when the drain bush is inserted within the drain hole in the motor housing, the axial groove and the inner and the outer radial grooves as well as the drain hole together define a continuous but bent moisture drain path extending through the housing wall and a substantially straight path substantially along the housing wall.

5 Claims, 4 Drawing Sheets

FIG. I
PRIOR ART

MOISTURE DRAIN BUSH FOR AN ENGINE STARTER MOTOR

BACKGROUND OF THE INVENTION

This invention relates to a moisture drain bush for an engine starter motor and, more particularly, to a moisture drain bush adapted to be inserted into and held by a moisture drain hole defined in a housing wall of an engine starter motor.

FIG. 1 illustrates one example of a conventional moisture drain bush attached to an engine starter motor. In FIG. 1, a stater motor 1 comprises a d.c. motor 2, an overrunning clutch unit with a pinion (not shown) disposed within a front bracket 3 and a solenoid switch unit 4 disposed above the motor 2 and the clutch unit. The d.c. motor 2 includes a yoke 5 and a rear bracket 6 mounted to the yoke 5 for rotatably supporting a rear end of a rotary shaft 8 of the motor 2 through a bearing 7. The motor 2 further includes a commutator 9 which is in sliding contact with a brush assembly 10 supported from the rear bracket 6. The rear bracket 6 has formed therein a moisture drain hole 11 in which a moisture drain bush 12 is inserted and held.

In FIGS. 2 and 3, which illustrate the details of the drain bush 12 shown in FIG. 1, the drain bush 12 is a substantially cylindrical tube member comprising a main body portion 13, an upper flange 14 formed at the upper end of the main body portion 13, a lower flange 15 disposed below the upper flange 14 with a clearance or a circumferential groove therebetween for receiving therein an edge of the rear bracket 6 defining the drain hole 11. The drain bush 12 also comprises a plurality of buffer plates 16 extending radially inwardly and downwardly and alternatively from the diametrically opposite inner surfaces of the tube so that a labyrinth or a serpentine flow path is defined. The upper flange 14 has formed therein two radially extending notches 14a.

The moisture within the motor housing flows through the drain notches 14a into the drain bush main body portion 13 and flows out from the bottom end of the drain bush 12. The splashed water drops entering into the drain bush 12 from its bottom end are prevented by the buffle plates 16 from passing through the drain bush 12 and entering into the interior of the motor housing.

With the above described conventional moisture drain bush, the drain bush 12 is projecting from the rear bracket 6 by a substantial radial distance. Therefore, the degree of freedom of the installation of the starter motor is limitted and some mounting space is occupied by the projecting drain bush 12.

FIGS. 4 and 5 illustrate another conventional moisture drain bush 18 for an engine starter disclosed in Japanese Patent Publication No. 60-53787. The drain bush 18 is a generally an inverted cup-shaped member made of an elastic material and comprises a top wall 18a having a downwardly extending partition wall 18b, a tubular side wall 18c having formed therein a pair of openings 18d at diametrically opposite positions and a flange 18e radially extending from an open end 18f of the side wall 18c. The drain bush 18 is elastically attached to the drain hole 11 of the housing wall 6 by the flange 18e and the circumferential groove 18g formed in the side wall 18c.

With the drain bush 18 illustrated in FIGS. 4 and 5, the height of the portion of the drain bush 18 that projects from the outer surface of the housing wall 6 is very low as compared to that of the drain bush 12 illustrated and described in conjunction with FIGS. 1 to 3. However, as shown in FIG. 5, while the water splash flying in the horizontal direction as shown by an arrow A is prevented from entering into the interior of the motor housing 6, the water splash from the below as illustrated by arrows B and C can often enter into the interior of the housing 6 and causes various harms to the starter motor, such as the generation of rust on various parts including the brushes, the brush springs and brush holders which can result in the malfunctioning of the starter 1.

Accordingly, a moisture drain bush 21 as illustrated in FIGS. 6 to 8 which is disclosed in U.S. patent application Ser. No. 477,376 filed on Feb. 9, 1990 assigned to the same assignee of the present application has been proposed. As illustrated in FIGS. 6 to 8, the proposed moisture drain bush 21 for use in a moisture drain hole 11 in an engine starter motor housing wall 6 comprises a stem 22 having an inner end 22a and an outer end 22b and axial length equal to a housing wall thickness and having axial grooves 22c extending between the inner and the outer ends 22a and 22b of the stem 22. The axial grooves 22c have a common bottom wall 22d which serves as a partition between two axial grooves 22c. An inner flange 23 having a flat inner surface 23a radially extending from the inner end 22a of the stem 22 and larger than the drain hole 11 is provided. The inner flange 23 also has two inner radial grooves 23d connected at their inner ends to the inner end of the axial grooves 22c in the stem 22 and radially extending therefrom to open at the outer periphery of the inner flange 23. An outer flange 24 having a flat inner surface 24a radially extends from the outer end of the stem 22 and larger than the drain hole 11 is provided. The outer flange 24 has two outer radial grooves 24d extending in the radially opposite directions and each connected at their inner ends to the outer ends of the axial grooves 22c of the stem 22 and open at their radially outer ends at the circumference of the outer flange 24 at substantially diametrically opposite positions.

Thus, when the drain bush 21 is inserted within the drain hole 11 in the motor housing 6, the axial grooves 22c of the stem and the inner and the outer radial grooves 23d and 24d of the inner and the outer flanges 23 and 24, respectively, as well as the drain hole together define two continuous but bent moisture drain paths extending through the housing wall 6. It is to be noted that two moisture drain paths are separated by the bottom wall 22d of or the partition between the two axial grooves 22c.

This moisture drain bush is advantageous in that it is simple in structure and has substantially no outwardly projecting portion and which effectively prevents ingress of water from the outside of the motor housing.

However, when a water splash or a jet of water impinges at the partition wall 22d of the stem 22 of the drain bush 21 at a greater speed, some water is reflected by the partition wall 22d and can splash back into the interior of the motor housing 6 through the inner radial grooves 23d.

SUMMARY OF THE INVENTION

Accordingly, one object of the present invention is to provide a moisture drain bush for an engine starter motor free from the above discussed problems.

A further object of the present invention is to provide a moisture drain bush which is simple in structure and has substantially no outwardly projection portion and which effectively prevents ingress of water from the outside of the motor housing.

With the above objects in view, the moisture drain bush of the present invention, which is for use in a moisture drain hole in an engine starter motor housing wall, comprises a stem having an inner and an outer end and an axial length equal to a housing wall thickness and having an axial groove extending between the inner and the outer ends of the stem. An inner flange having a flat inner surface radially extending from the inner end of the stem and larger than the drain hole is provided. The inner flange also has an inner radial groove connected at its inner end to the inner end of the axial groove in the stem and radially extending therefrom to open at the outer periphery of the inner flange. An outer flange having a flat inner surface radially extends from the outer end of the stem and larger than the drain hole is provided. The outer flange has an inner groove that radially extends through the axial stem so connecting the two diametrically opposed outer peripheries of the outer flange with the axial groove in the stem.

BRIEF DESCRIPTION OF THE DRAWINGS

The present invention will become more readily apparent from the following detailed description of the preferred embodiment of the present invention taken in conjunction with the accompanying drawings, in which.

DESCRIPTION OF THE PREFERRED EMBODIMENT

FIGS. 9 to 12 illustrate a moisture drain bush 31 adapted to be inserted into and held by a moisture drain hole 11 defined in a housing wall 6 of an engine starter motor 5. In the illustrated embodiment, the housing wall 6 in which the moisture drain hole 11 is formed is a rear bracket attached to a yoke of the starter motor 5. The moisture drain bush 31 is made of an elastic material such as rubber and a relatively soft flexible synthetic resin.

Figure 9:
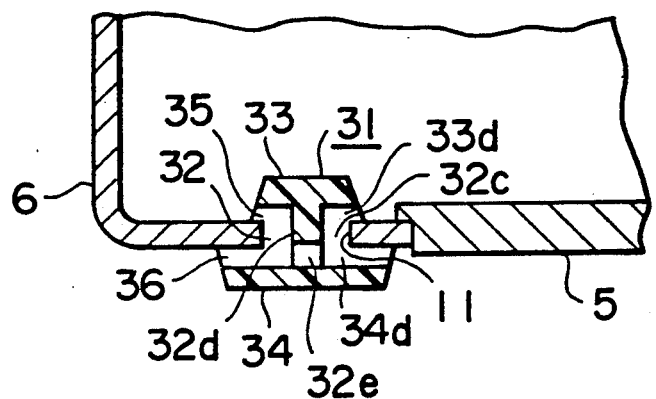
FIG. 9 is a sectional view of the moisture drain bush of the present invention as attached to the rear bracket of the starter motor.
Figure 10:
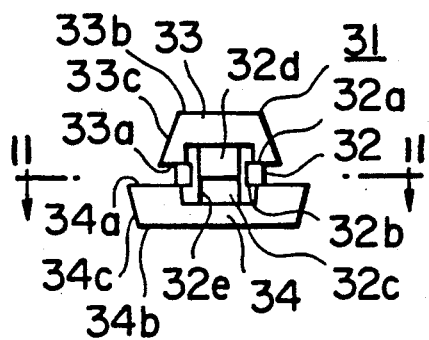
FIG. 10 is a side view of the moisture drain bush of the present invention.
Figure 11:
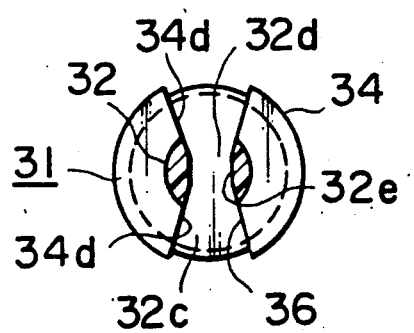
FIG. 11 is a sectional view of the moisture drain bush taken along line 11—11 of FIG. 10.

The moisture drain bush 31 comprises a substantially cylindrical, relatively short stem 32 having a first end 32a and a second end 32b (see FIG. 10). The stem 32 has an axial length substantially equal to the thickness of the rear bracket 6 and the diameter substantially equal to the diameter of the drain hole 11. The stem 32 also has formed therein two axial grooves 32c extending between the first and the second ends 32a and 32b of the stem 32 over the entire length of the stem 32. The two axial grooves 32c are disposed at the diametrically opposite positions on the circumference of the cylindrical stem 32 as best seen from FIG. 9 and have a bottom wall or partition wall 32d between them. It is to be noted that the partition wall 32d has a through hole 32e.

The moisture drain bush 31 also comprises a substantially frustoconical first flange 33 having a substantially flat inner surface 33a radialy extending from the first end 32a of the stem 32, a substantially flat outer surface 33b parallel to the inner surface 33a and a substantially conical circumferential surface 33c between the inner and the outer surfaces 33a and 33b. As best seen from FIGS. 9, and 10 the inner surface 33a has a diameter larger than the diameter of the drain hole 11 and the outer surface 33b has a diameter smaller than the diameter of the drain hole 11. The inner flange 33 also has formed in the inner surface 33a two inner radial grooves 33d extending in the radially opposite directions and each connected at a radially inner end thereof to the inner end of each of the axial grooves 32c in the stem 32. The radially outer ends of the radial grooves 33d are open at two diametrically opposite positions on the conical circumferential surface 33c of the outer periphery of the first flange 33.

The moisture drain bush 31 further comprises a substantially frustoconical outer flange 34 having a substantially flat inner surface 34a radially extending from the outer end 32b of the stem 32, a substantially flat outer surface 34b parallel to the inner surface 34a and a substantially conical circumferential surface 34c between the inner and outer surfaces 34a and 34b. As best seen from FIGS. 9, and 10 the inner surface 34a has a diameter larger than the diameter of the drain hole 11 and the outer surface 34b has a diameter slightly smaller than the diameter of the inner surface 34a.

The outer flange 34 has formed in the inner surface 34a two outer radial grooves 34d extending in the radially opposite directions and each connected at a radially inner end thereof to the outer end of each axial grooves 32c in the stem 32. The radially outer ends of the radial grooves 34d are open at two diametrically opposite positions on the conical circumferential surface 34c of the outer periphery of the second flange 34. It is seen that the first radial grooves 33d of the first flange 33, the axial grooves 32c of the stem 32 and the second radial grooves 34d of the second flange 34 are serially connected in the above-named order at each diametrically opposite sides of the moisture drain bush 31 to define a continuous, substantially C-shaped moisture passages According to the present invention, the partition wall 32d separating the two moisture passages 35 has formed at the lower portion thereof a through hole 32e which communicates the radially inner ends of the outer radial grooves 34d with each other. In other words, the outer flange 34 has formed in its inner surface 34a a single, substantially straight, outer radial groove 36 which extends across the outer flange 34 to open at the outer periphery 34c of the outer flange 34 at substantially diametrically opposite positions. The outer radial groove 36 can be said to be connected to the outer ends 32b of two axial grooves 32.

Thus, when the drain bush 31 is inserted within the drain hole 11 in the motor housing rear bracket 6, two continuous but bent moisture drain paths 35 extending through the housing wall 6 and a single substantially straight drain path 36 substantially along the housing wall 6 is provided. More particularly, a labyrinth drain passage of a general shape of an inverted "π" shape as seen in FIG. 9 is formed within the drain bush 31 by the two inner radial grooves 33d in the inner flange 33, two axial grooves 32c in the stem 32 which is respectively connected to the radial grooves 33d, the single outer straight groove 36 in the outer flange 34 and by the edge of the housing wall 6 defining the drain hole 11.

Figure 1:
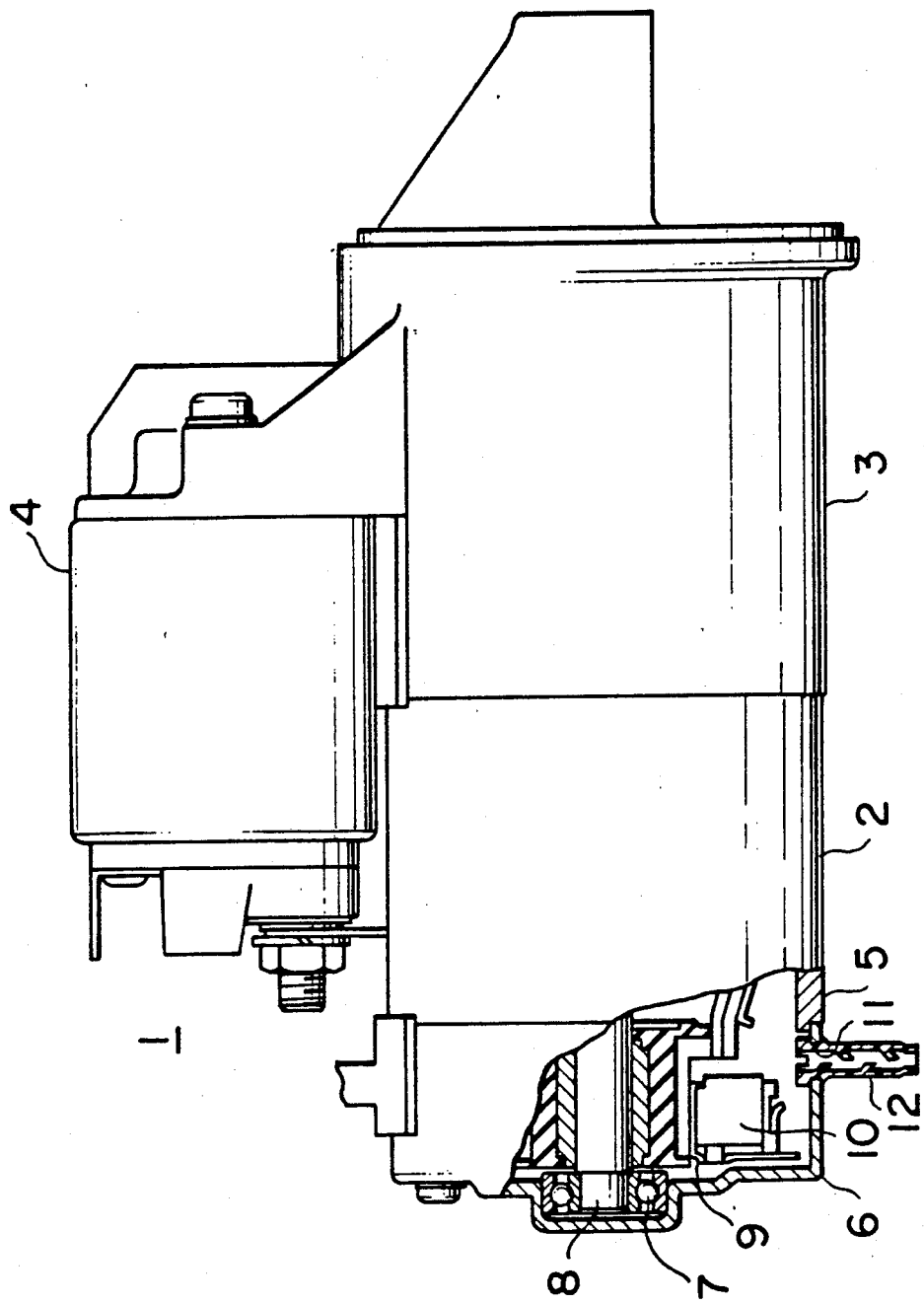
FIG. 1 is a side view of an engine starter motor partly in section illustrating a conventional moisture drain bush.
Figure 2:
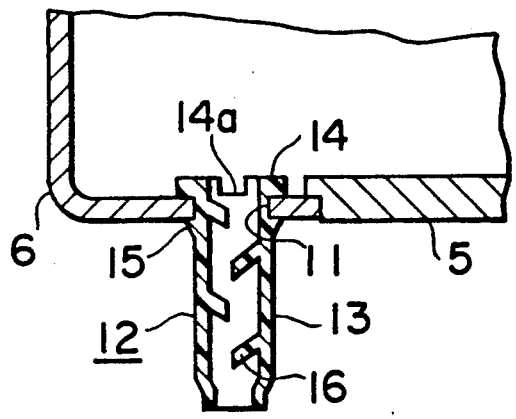
FIG. 2 is a sectional view of the moisture drain bush shown in FIG. 1 attached to the rear bracket of the starter motor.
Figure 3:
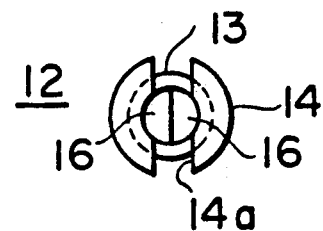
FIG. 3 is a plan view of the moisture drain bush shown in FIG. 2.
Figure 4:
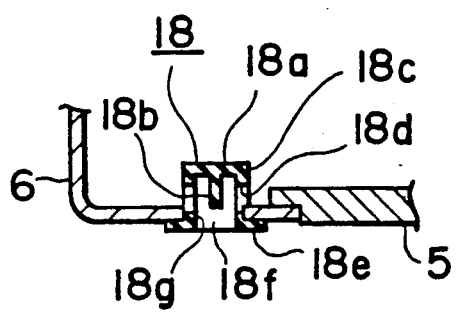
FIG. 4 is a sectional view of another conventional moisture drain bush.
Figure 5:
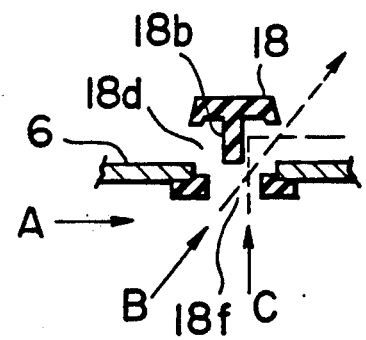
FIG. 5 is a schematic diagram for explaining the manner in which the water splash can pass through the drain bush shown in FIG. 4.
Figure 6:
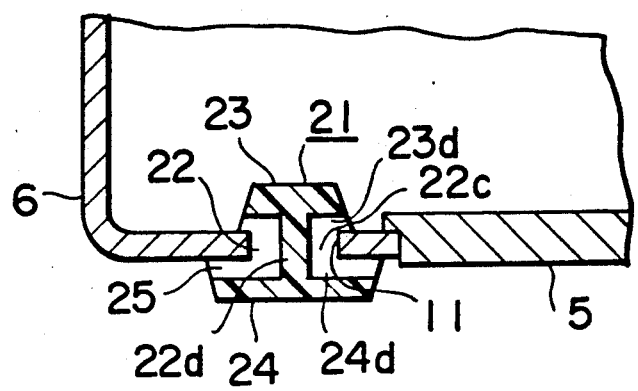
FIG. 6 is a sectional view of the moisture drain bush of a previously proposed structure.
Figure 7:
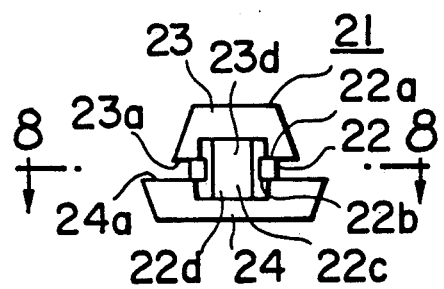
FIG. 7 is a side view of the moisture drain bush shown in FIG. 6.
Figure 8:
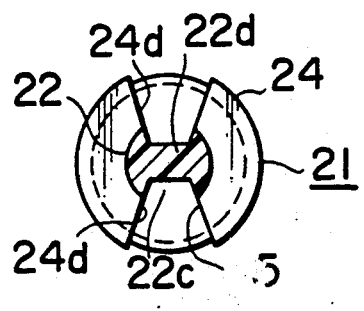
FIG. 8 is a sectional view of the moisture drain bush taken along line 8—8 of FIG. 7.
Figure 12:
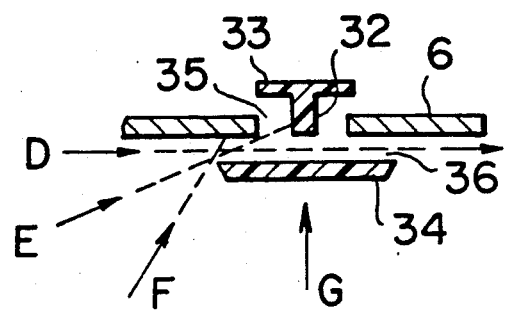
FIG. 12 is a schematic diagram explaining how the moisture drain bush illustrated in FIGS. 9 to 11 prevents ingress of water splash.

As illustrated in FIG. 12, while these drain passages 35 and 36 allow the moisture within the starter motor to be drained therethrough, the water drops or any other foreign matters are not permitted to enter into the housing as clearly illustrated by arrows D, E, F and G. It should be noted that according to the present invention, a jet or splash of water in the horizontal direction as depicted by the arrow D which enters into the opening in the outer flange 34 is allowed to fly or flow straight through the outer straight diametrical path 36 in the outer flange 34 without any interference. This is in contrast to the previously proposed design as illustrated and described in conjunction with FIGS. 6 to 8 which the horizontal water jet or splash impinges upon the partition wall 22d and splashes back into the interior of the motor housing 6 through the drain path 25.

As has been described, according to the present invention, the moisture drain bush for use in a moisture drain hole in an engine starter motor housing wall of the present invention comprises a stem having an inner and an outer end and an axial length equal to a housing wall thickness and having an axial groove extending between the inner and outer ends of the stem. An inner flange is provided which may be frustoconical shape so that its conical circumferential surface guides and assists smooth insertion of the flange into the drain hole, and the inner flange has a flat inner surface radially extending from the inner end of the stem and larger than the drain hole. The outer flange has an inner radial groove extending across the outer flange to open at the outer periphery of the outer flange at substantially diametrically opposite positions, the outer radial groove being connected to the outer end of the axial groove. Thus, when the drain bush is inserted within the drain hole in the motor housing, the axial groove and the inner and the outer radial grooves as well as the drain hole together define a continuous but bent moisture drain path extending through the housing wall and a substantially straight path substantially along the housing wall.

Therefore, the moisture drain bush of the present invention is simple in structure and has substantially no outwardly projecting portion and which effectively prevents ingress of water from the outside of the motor housing.

What is claimed is:

1. A moisture drain bush adapted to be inserted into and held by a moisture drain hole defined in a housing wall of an engine starter motor, comprising:
   a stem having an inner end and an outer end, said stem having an axial length substantially equal to a thickness of said housing wall and having an axial groove having an inner end and an outer end and extending between said inner and said outer ends of said stem;
   an inner flange having a substantially flat inner surface radially extending from said inner end of said stem, said inner surface having a diameter larger than the diameter of said drain hole and having a first radial groove connected at an inner end thereof to said inner end of said axial groove in said stem and radially extending therefrom to open at the outer periphery of said inner flange; and
   an outer flange having a substantially flat inner surface radially extending from said outer end of said stem, said inner surface having a diameter larger than the diameter of said drain hole, said inner surface of said outer flange having an outer radial groove extending across said outer flange to open at the outer periphery of said outer flange at substantially diametrically opposite positions, said outer radial groove being connected to said outer end of said axial groove in said stem;
   whereby, when said drain bush is inserted within said drain hole in said motor housing, said axial groove and said inner and said outer radial grooves as well as said drain hole together defining a continuous but bent moisture drain path extending through said housing wall and a substantially straight path substantially along said housing wall.

2. A moisture drain bush as claimed in claim 1, wherein said axial groove and an additional axial groove and said inner and outer radial grooves and addition inner and outer radial grooves are provided at two substantially diametrically opposite positions to define two continuous but bent moisture drain paths.

3. A moisture drain bush as claimed in claim 2, wherein said two continuous but bent moisture drain paths and said straight path define a substantially inverted "π"-shaped drain passage.

4. A moisture drain bush as claimed in claim 1, wherein said inner flange has a substantially conical surface, said conical surface having a circumference having an outer surface diameter smaller than the diameter of said drain hole, whereby said conical surface assists the edge of said housing wall defining said drain hole to ride and slide thereon to override said larger diameter of said inner surface of said inner flange.

5. A moisture drain bush as claimed in claim 1, wherein said axial groove and an additional axial groove and said inner and outer radial grooves and additional inner and outer radial grooves are provided at two substantially diametrically opposite positions to define two continuous but bent moisture drain paths, said two continuous but bent moisture drain paths and said straight path define a substantially inverted "π"-shaped drain passage, and wherein said inner flange has a substantially conical surface, said conical surface having a circumference having an outer surface diameter smaller than the diameter of said drain hole, whereby said conical surface assists the edge of said housing wall defining said drain hole to ride and slide thereon to override said larger diameter of said inner surface of said inner flange.

* * * * *